United States Patent
Wu

(10) Patent No.: US 11,742,726 B2
(45) Date of Patent: Aug. 29, 2023

(54) MOTOR STATOR HAVING A TEMPERATURE SENSOR DISPOSED IN AN ACCOMMODATION SLOT

(71) Applicant: DELTA ELECTRONICS, INC., Taoyuan (TW)

(72) Inventor: Yi-Ming Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 19 days.

(21) Appl. No.: 17/456,642

(22) Filed: Nov. 28, 2021

(65) Prior Publication Data

US 2023/0029659 A1   Feb. 2, 2023

(30) Foreign Application Priority Data

Jul. 27, 2021 (CN) .......................... 202110848503.4

(51) Int. Cl.
| | |
|---|---|
| H02K 11/25 | (2016.01) |
| H02K 1/16 | (2006.01) |
| H02K 3/487 | (2006.01) |
| H02K 3/28 | (2006.01) |
| H02K 3/14 | (2006.01) |

(52) U.S. Cl.
CPC ............. *H02K 11/25* (2016.01); *H02K 1/165* (2013.01); *H02K 3/14* (2013.01); *H02K 3/28* (2013.01); *H02K 3/487* (2013.01)

(58) Field of Classification Search
CPC H02K 1/16; H02K 1/165; H02K 3/14; H02K 3/28; H02K 3/48; H02K 3/487
USPC ........................................ 310/179, 181, 184
See application file for complete search history.

(56) References Cited

U.S. PATENT DOCUMENTS

| | | | | |
|---|---|---|---|---|
| 10,468,949 B2* | 11/2019 | Yamagishi | ............... | H02K 9/19 |
| 10,720,825 B2 | 7/2020 | Cardamone et al. | | |
| 10,903,726 B2* | 1/2021 | Yokoi | .................... | H02K 11/25 |
| 11,569,714 B2* | 1/2023 | Wu | ......... | H02K 11/25 |
| 2019/0363615 A1* | 11/2019 | Yokoi | ....................... | H02K 3/16 |
| 2020/0144896 A1 | 5/2020 | Tounosu et al. | | |
| 2021/0376671 A1* | 12/2021 | Tsuchiya | ............... | H02K 3/345 |

(Continued)

FOREIGN PATENT DOCUMENTS

| | | |
|---|---|---|
| CN | 105471128 B | 11/2018 |
| JP | 2012095480 A | 5/2012 |

(Continued)

*Primary Examiner* — Rashad H Johnson
(74) *Attorney, Agent, or Firm* — CKC & Partners Co., LLC

(57) ABSTRACT

A motor stator includes a ring-shaped core defining a rotor accommodation space, a plurality of slots, a first hairpin conductor, a second hairpin conductor, and a temperature sensor. The slots are disposed in the core and arranged to surround the rotor accommodation space circumferentially. The slots extend radially from the rotor accommodation space. The core includes an insertion side and an extension side. The slots include a temperature sensor accommodation slot which, at the insertion side, has a radial length greater than a radial length of any other one of the slots. The first hairpin conductor is disposed in the temperature sensor accommodation slot distal to the rotor accommodation space. The second hairpin conductor is disposed in the temperature sensor accommodation slot, and the temperature sensor is disposed between the first and second hairpin conductors.

20 Claims, 6 Drawing Sheets

(56) References Cited

U.S. PATENT DOCUMENTS

| | | | | |
|---|---|---|---|---|
| 2022/0140703 A1* | 5/2022 | Wu | .................. | H02K 11/25 |
| | | | | 310/68 C |
| 2022/0393538 A1* | 12/2022 | Engelhardt | ............ | H02K 1/165 |
| 2023/0029659 A1* | 2/2023 | Wu | .................. | H02K 3/487 |

FOREIGN PATENT DOCUMENTS

| JP | 2018085784 A | 5/2018 |
|---|---|---|
| JP | 2018170924 A | 11/2018 |
| TW | I535147 B | 5/2016 |

\* cited by examiner

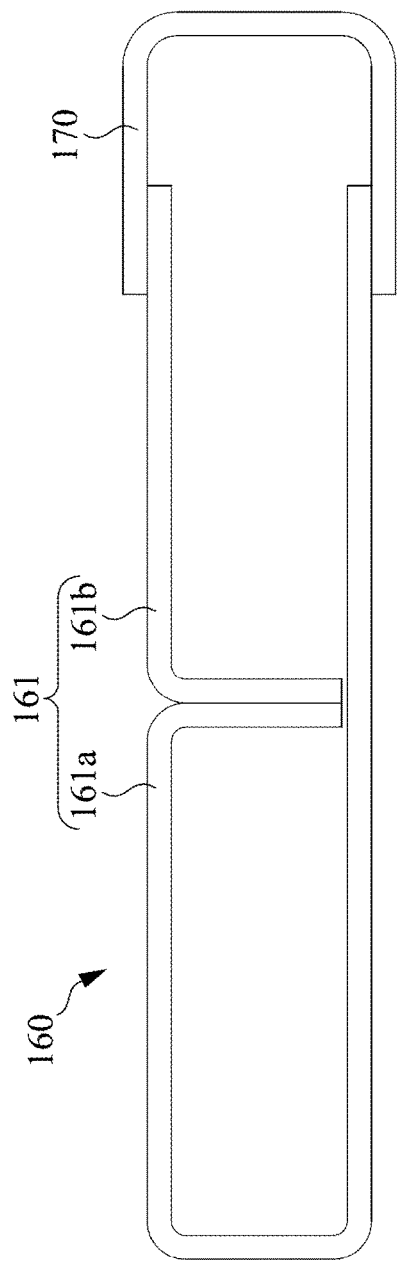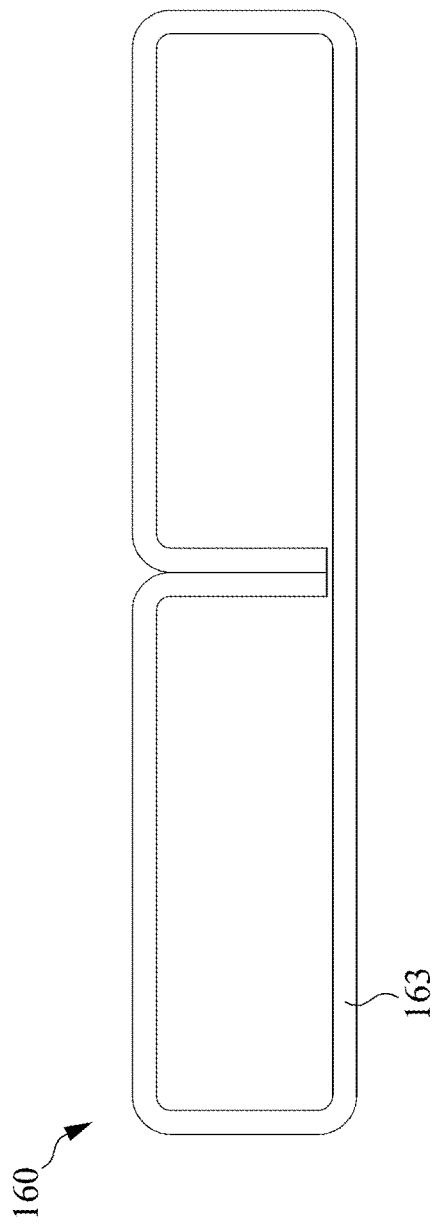
Fig. 6
Fig. 7

MOTOR STATOR HAVING A TEMPERATURE SENSOR DISPOSED IN AN ACCOMMODATION SLOT

CROSS-REFERENCE TO RELATED APPLICATION

This application claims priority to China Application Serial Number 202110848503.4, filed Jul. 27, 2021, which is herein incorporated by reference in its entirety.

BACKGROUND

Field of Invention

The present invention relates to a motor and motor stator, and more particularly to a motor and motor stator having hairpin wires.

Description of Related Art

Conventional operation control of a motor is limited by the measurement accuracy of a temperature sensor inside the motor. Typically a larger hypothetical temperature difference is used as a temperature buffer to protect the motor, which can be too conservative in motor operation control. The conventional motor stator does not have a suitable temperature sensor accommodation space, resulting in the temperature sensor unable to measure the hot spots accurately during motor operation. In view of such issue, motor manufacturers are actively looking for solutions that can reduce the temperature difference between actual and measured values during motor operation, in order to better control motor operations and improve motor performance.

SUMMARY

The present disclosure proposes a motor stator and motor thereof for overcoming or alleviating the problems of the prior art.

In one or more embodiments, a motor stator includes a ring-shaped core, a plurality of slots, a first hairpin conductor, a second hairpin conductor, and a temperature sensor. The ring-shaped core defines a rotor accommodation space at a center of the core, in which the core includes an insertion side and an extension side. The slots are disposed in the core and arranged to surround the rotor accommodation space circumferentially, and each slot extends radially away from the rotor accommodation space, such that hairpin conductors are inserted in the slots from the insertion side and to protrude from the extension side. At least one of the slots is a temperature sensor accommodation slot which has a radial length at the insertion side greater than a radial length of any other one of the slots at the insertion side except for the temperature sensor accommodation slot. The first hairpin conductor is disposed at an end of the temperature sensor accommodation slot distal to the rotor accommodation space. The second hairpin conductor is disposed in the temperature sensor accommodation slot and adjacent to the first hairpin conductor. The temperature sensor is disposed in the temperature sensor accommodation slot and between the first and second hairpin conductors.

In one or more embodiments, a motor includes a rotor, a core, a plurality of slots, a first hairpin conductor, and a second hairpin conductor. The core defines a rotor accommodation space for accommodating the rotor. The slots are disposed in the core and arranged to surround the rotor accommodation space circumferentially, in which each slot axially extends and accommodates hairpin conductors. At least one of the slots is a temperature sensor accommodation slot. A first hairpin conductor is disposed in the temperature sensor accommodation slot, in which the first hairpin conductor includes a bent portion, a first axial extension portion, and a second axial extension portion. The bent portion is connected between the first axial extension portion and the second axial extension portion, and a temperature sensor adjoins the first axial extension portion of the first hairpin conductor, the first axial extension portion is radially farther from the rotor accommodation space than the second axial extension portion.

In one or more embodiments, a motor stator includes a ring-shaped core, a plurality of slots, a first hairpin conductor, and a temperature sensor. The slots are disposed in the core and extends radially to an outer circumferential surface of the core, and at least one of the slots is a temperature accommodation slot including a first slot space and a second slot space axially adjacent to the first slot space, and the first slot space has a radial length greater than a radial length of the second slot space. The first hairpin conductor includes a first axial extension portion disposed in the first slot space and a second axial extension portion disposed in the second slot space, in which the first axial extension portion is connected to the second axial extension portion. The temperature sensor is disposed in the first slot space, and the temperature sensor is farther away from the outer circumferential surface of the core than the first axial extension portion.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 6 is a cross section view taken from the line 6-6 in FIG. 5; and

FIG. 7 is a cross section view taken from the line 7-7 in FIG. 5

DETAILED DESCRIPTION

Figure 1:
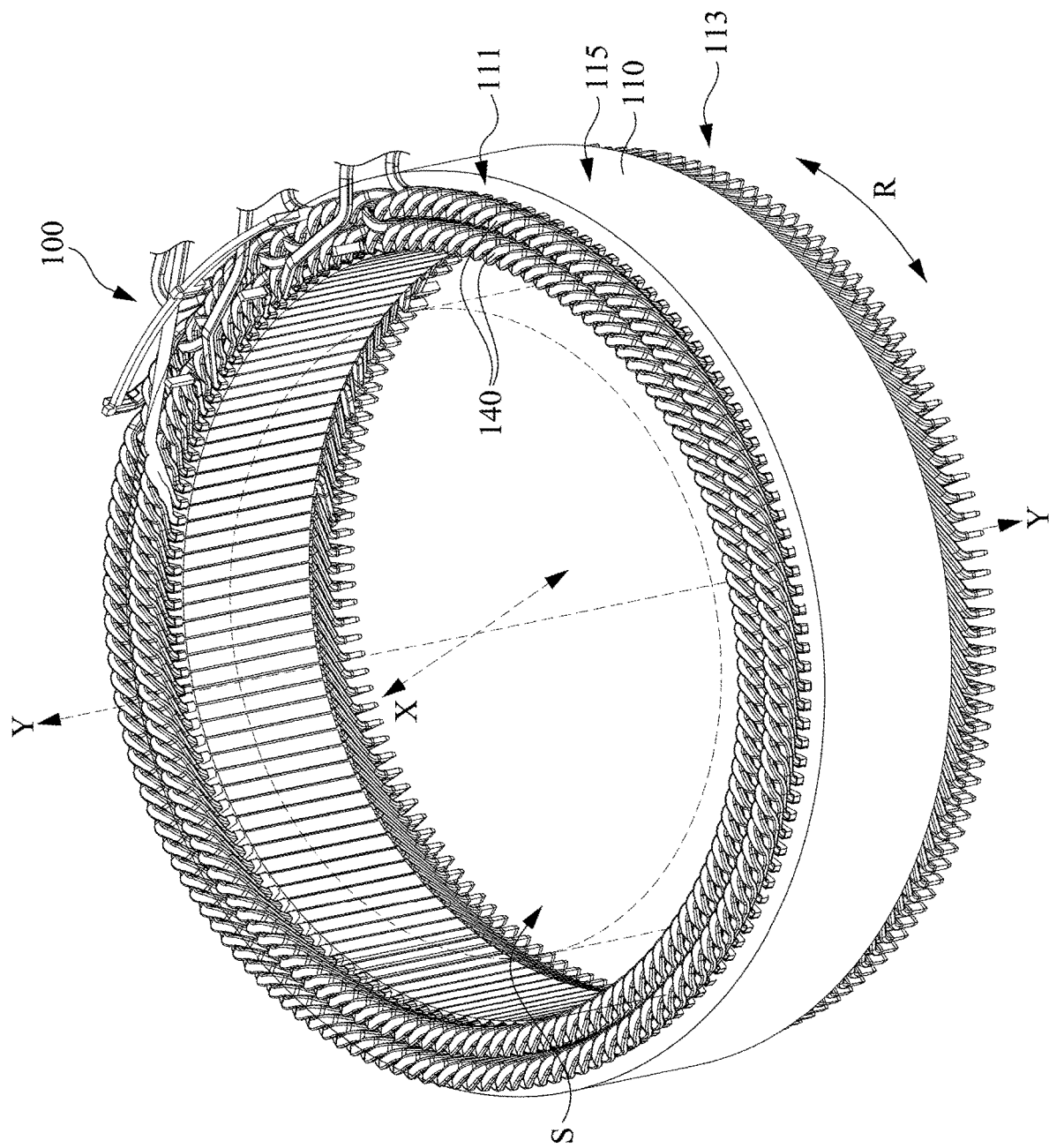
FIG. 1 illustrates a schematic view of a motor in accordance with some embodiments of the present invention.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1, which illustrates a motor 10 including a motor stator 100 and a rotor (not shown) located in the motor stator 100. The motor stator 100 is energized and excited for driving the rotor to rotate. When the motor 10 is operating, a temperature of the motor stator 100 and the motor 10 will significantly increase. Even if the motor 10 is cooled (for instance, the motor 10 is cooled by a liquid cooling system), there still are many hot spots inside the motor 10 that cannot be cooled immediately (for example, hot spots inside the motor stator 100 cannot be cooled immediately). If the actual temperatures of these hot spots cannot be more accurately measured when the motor 10 is in operation, the motor operation or cooling control may suffer, and the performance of the motor 10 is affected.

Figure 2:
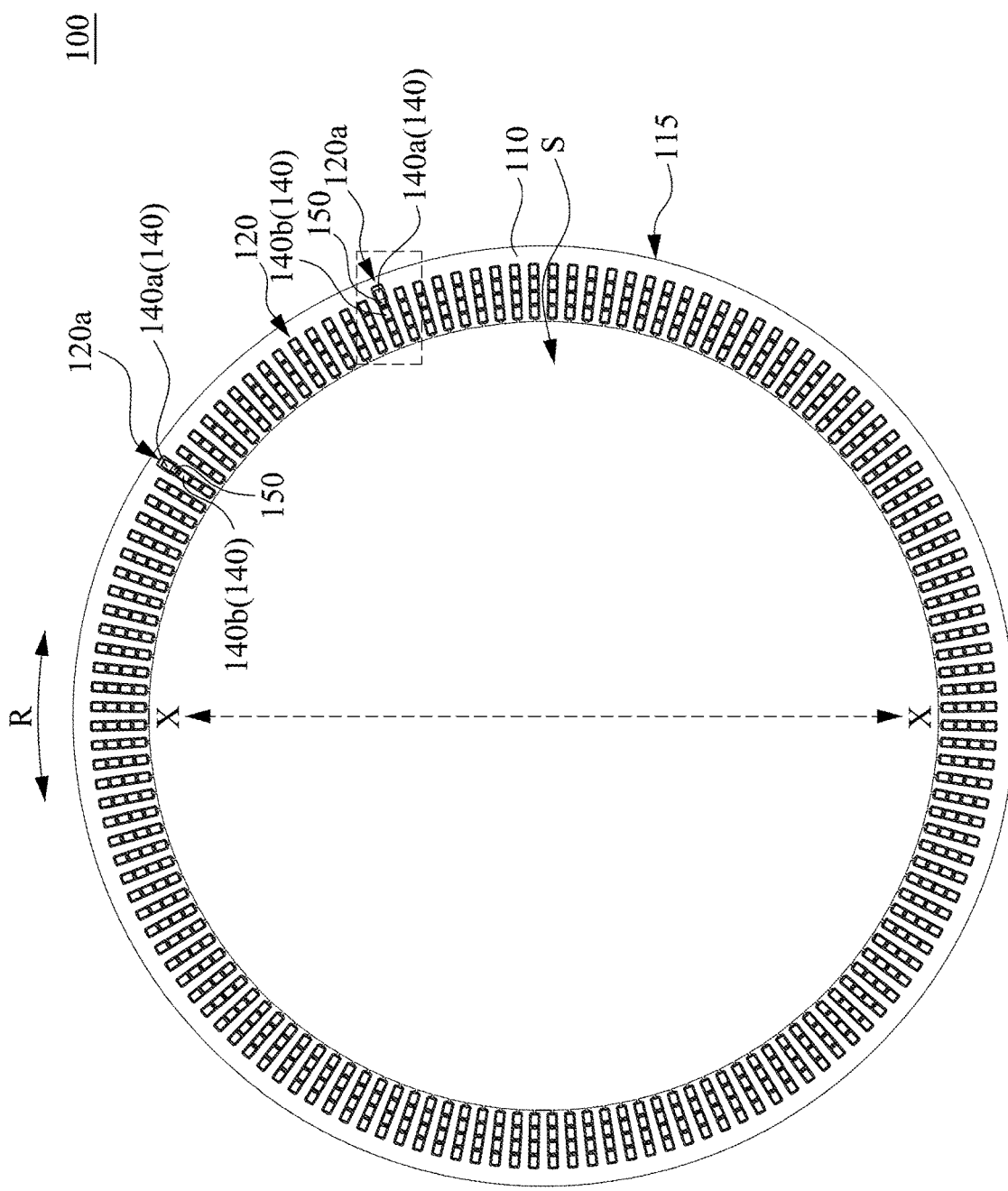
FIG. 2 illustrates a top view of a motor stator in accordance with embodiments of the present invention.

Reference is made to FIGS. 1-2, which illustrate the motor stator 100 including a core 110, a plurality of slots 120, a plurality of hairpin conductors 140, and a temperature sensor 150. The core 110 is ring-shaped and configured for defining a rotor accommodation space S at a center of the core 110, in which the core 110 includes an insertion side 111 (also called as a first side) and an extension side 113 (also called as a second side). The slots 120 are in the core 110, and each slot 120 extends along an axial direction Y and extends through the core 110. The slots 120 are spaced apart with each other and arranged along a circumferential direction R to surround the rotor accommodation space S, and each slot 120 extends along a radial direction X of the core 110 and extends away from the rotor accommodation space S. In other words, each of the slots 120 extends along the radial direction X and extends toward an outer circumferential surface 115, and the hairpin conductors 140 are inserted into the corresponding slots 120 from the insertion side 111 and to protrude from the extension side 113. At least one of the slots 120 is a temperature sensor accommodation slot 120a.

Figure 3:
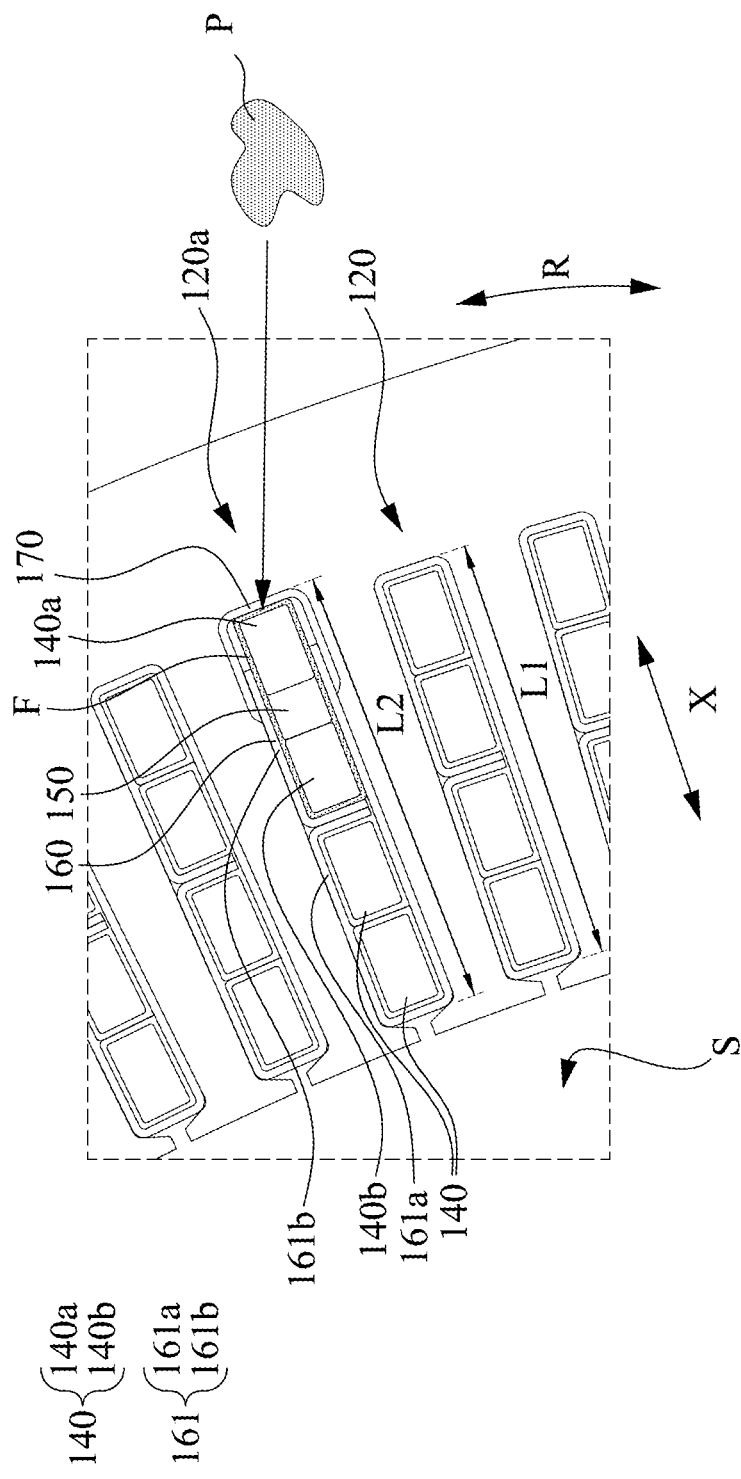
FIG. 3 illustrates an enlargement diagram of a dotted square in FIG. 2.

Reference is made to FIG. 3. At the insertion side 111 of the core 110, the temperature sensor accommodation slot 120a has a radial length greater a radial length of any other one of the slots 120 except for the temperature sensor accommodation slot 120a. For instance, the temperature sensor accommodation slot 120a has a radial length L2 on the core 110 greater than a radial length L1 of any other one of the slots 120 on the core 110 except for the temperature sensor accommodation slot 120a. Therefore, the temperature sensor accommodation slot 120a has a size greater than a size of any other one of the slots 120, such that the temperature sensor accommodation slot 120a has a greater space to accommodate the hairpin conductors 140 and the temperature sensor 150. Since the temperature sensor 150 is inside the temperature sensor accommodation slot 120a on the core 110 and disposed among the hairpin conductors 140, the temperature sensor 150 can directly and accurately detect the internal temperature of the motor 10 and the motor stator 100 when the motor 10 is operating.

Figure 4:
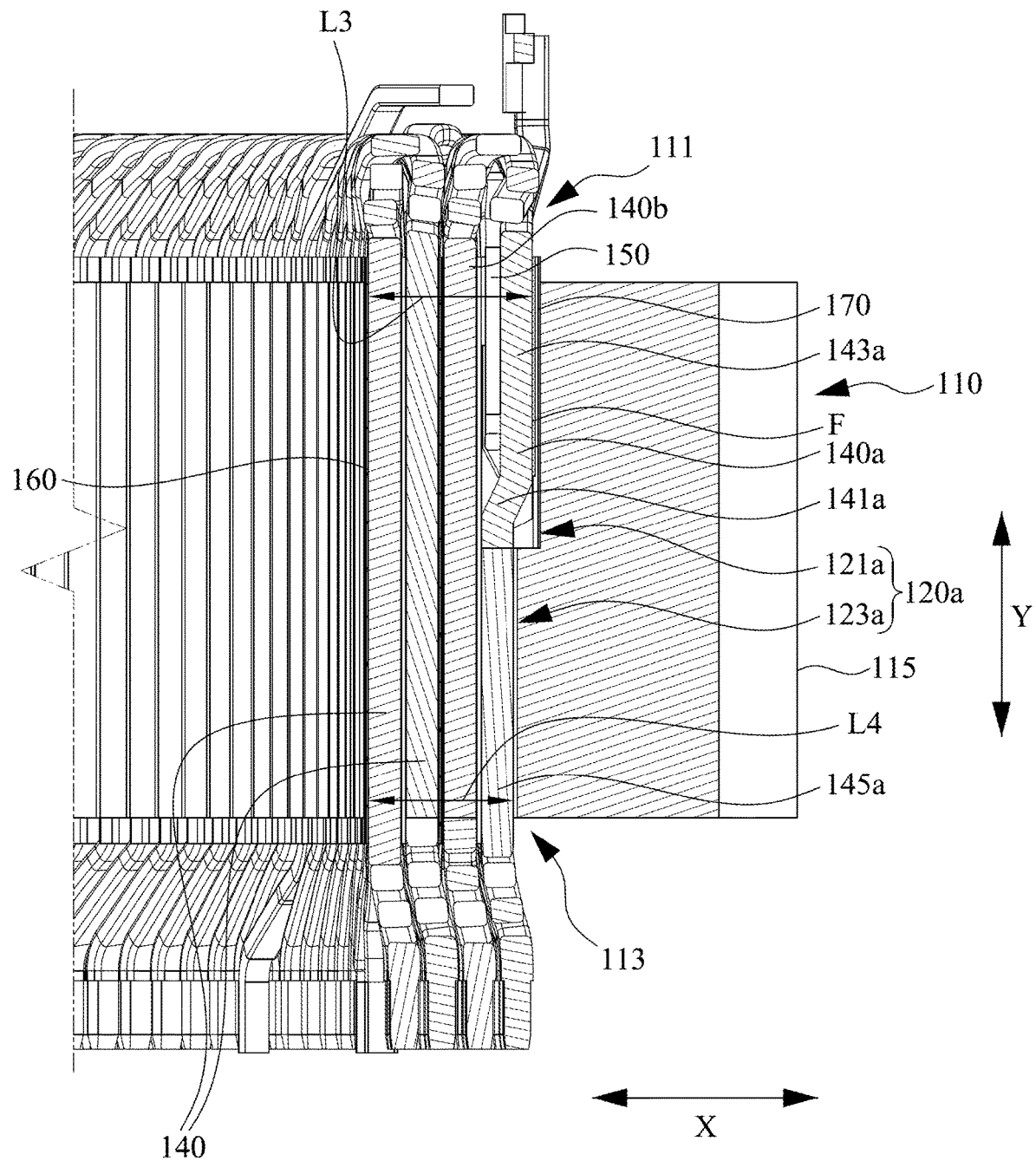
FIG. 4 illustrates a cross-section view of a motor stator in accordance with embodiments of the present invention.
Figure 5:
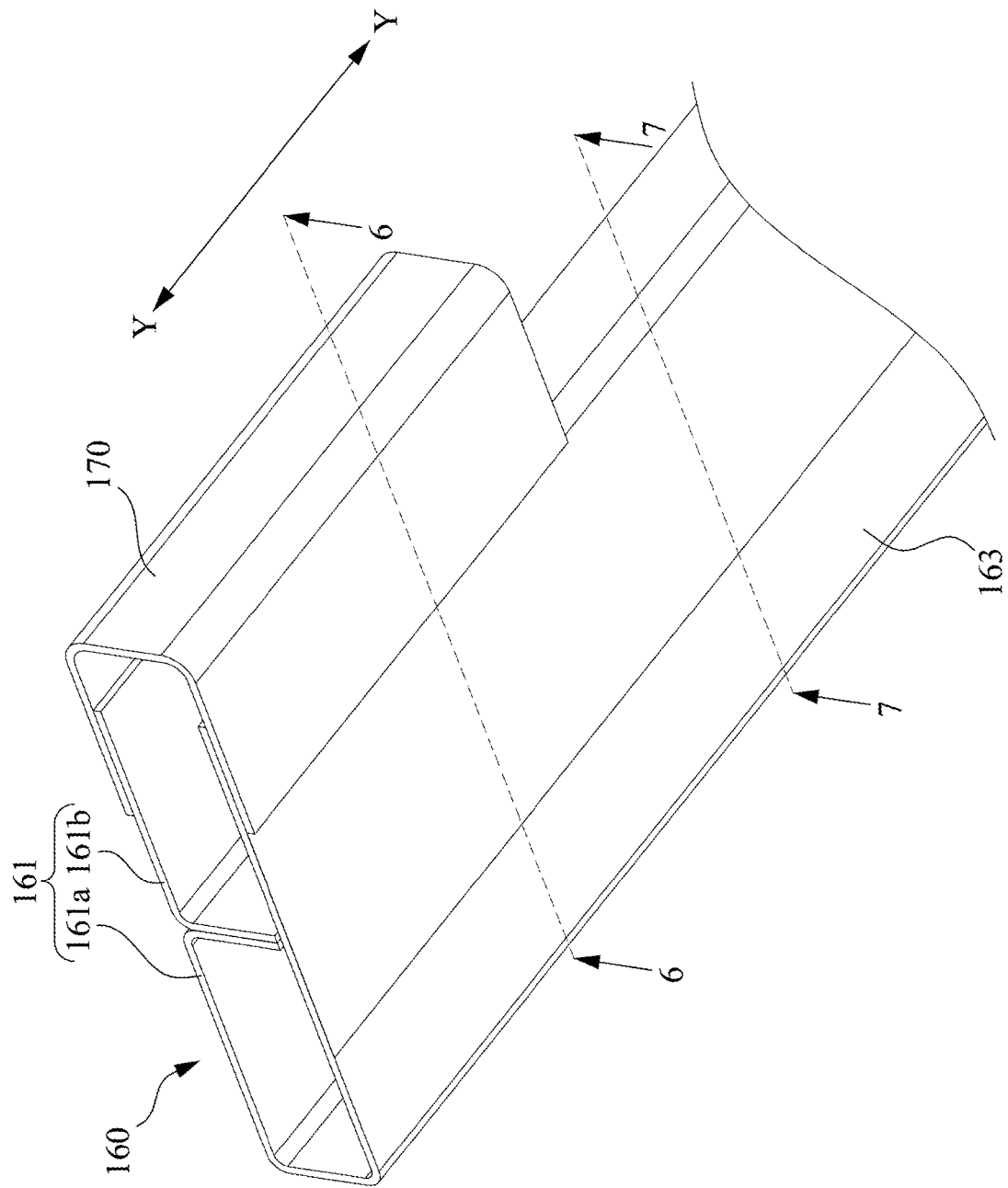
FIG. 5 illustrates a schematic view of an insulation structure in accordance with embodiments of the present invention.

Reference is made to FIG. 3 and FIG. 4. In some embodiments of the present invention, the hairpin conductors 140 include at least a first hairpin conductor 140a and a second hairpin conductor 140b. The first hairpin conductor 140a includes a first axial extension portion 143a and a second axial extension portion 145a, in which the first axial extension portion 143a and the second axial extension portion 145a extend along the axial direction Y. The first axial extension portion 143a is closer to the insertion side 111 and farther from the extension side 113 than the second axial extension portion 145a, and the first axial extension portion 143a is closer to the outer circumferential surface 115 of the core 110 than the second axial extension portion 145a, such that the temperature sensor 150 can be disposed in a space between the first hairpin conductor 140a and the adjacent second hairpin conductor 140b, so as to accurately detect the internal temperature of the motor 10 when the motor 10 is operating. In addition, the second hairpin conductor 140b can be a straight conductive wire extending along the axial direction Y. In some embodiments, the second hairpin conductor 140b is a curved conductive wire, such that the temperature sensor 150 is accommodated between the first hairpin conductor 140a and the second hairpin conductor 140b.

In some embodiments of the present invention, the first hairpin conductor 140a includes a bent portion 141a connected between the first axial extension portion 143a and the second axial extension portion 145a. The first axial extension portion 143a and the second axial extension portion 145a are displaced in the radial direction X and spaced apart in the axial direction Y. The temperature sensor 150 is disposed between the first hairpin conductor 140a and the second hairpin conductor 140b, such that the first hairpin conductor 140a and the adjacent second hairpin conductor 140b collectively accommodate the temperature sensor 150. The temperature sensor 150 adjoins the second axial extension portion 145a in the axial direction Y. In some embodiments of the present invention, different curving degrees of the bent portion 141a influence relative positions between the first axial extension portion 143a and the second axial extension portion 145a, such that the first hairpin conductor 140a and the second hairpin conductor 140b form a space therebetween to appropriately accommodate the temperature sensor 150. Depending on the curving degree of the bent portion 141a, an internal space of the temperature sensor accommodation slot 120a for accommodating the temperature sensor 150 is changed, so that the temperature sensor 150 in different sizes and categories can be adopted for accurately detecting the temperature of the motor 10. Moreover, the configuration, such as inclining angle and position, of the first axial extension portion 143a can be adjusted to change the bent portion 141a, such that the first hairpin conductor 140a and the second hairpin conductor 140b can firmly fix and accommodate the temperature sensor 150.

In some embodiments of the present invention, the temperature sensor 150 is adjacent to or in direct contact with the first axial extension portion 143a of the first hairpin conductor 140a, and the first axial extension portion 143a and the temperature sensor 150 are arranged side by side along the radial direction X, in which the first axial extension portion 143a is farther from the rotor accommodation space S than the second axial extension portion 145a on the core 110 in the radial direction X. For instance, the first hairpin conductor 140a is located at an end of the temperature sensor accommodation slot 120a distal to the rotor accommodation space S, and the second hairpin conductor 140b is inside the temperature sensor accommodation slot 120a and adjacent to the first hairpin conductor 140a. Moreover, the temperature sensor 150 is inside the temperature sensor accommodation slot 120a and accommodated between the first hairpin conductor 140a and the second hairpin conductor 140b. In other words, the first axial extension portion 143a of the first hairpin conductor 140a is closer to the outer circumferential surface 115 of the core 110 than the second hairpin conductor 140b in the radial direction X.

In some embodiments of the present invention, the first hairpin conductor 140a is a neutral wire or a terminal wire. The neutral wire or the terminal wire adjoins the temperature sensor 150. In comparison with other conductive wire, the neutral wire has low voltage, so that the risk of insulation damage is low for increasing the reliability of the product.

In some embodiments of the present invention, the second hairpin conductor 140b straightly extends along the axial direction Y to adjoin or contact the second axial extension portion 145a of the first hairpin conductor 140a, in which the space that accommodates the temperature sensor 150 has an area adjacent to the bent portion 141a and/or the first axial extension portion 143a. The temperature sensor 150 is in direct contact with at least one of the first axial extension portion 143a of the first hairpin conductor 140a and the second hairpin conductor 140b, so as to directly detect the internal temperature of the motor 10. In some embodiments of the present invention, the second hairpin conductor 140b, the temperature sensor 150, and the first axial extension portion 143a are sequentially arranged along the radial direction X of the core 110. When the motor 10 is operating, the second hairpin conductor 140b and the first axial extension portion 143a clamp at two sides of the temperature sensor 150 in the radial direction X, so as to prevent the temperature sensor 150 from shaking and interfering the temperature detection.

In some embodiments of the present invention, the first axial extension portion 143a protrudes from the insertion side 111, and the second axial extension portion 145a protrudes from the extension side 113. The temperature sensor accommodation slot 120a has a greater diameter at the insertion side 111 than a diameter of temperature sensor accommodation slot 120a at the extension side 113, such that the first hairpin conductor 140a, the second hairpin conductor 140b, and the temperature sensor 150 are inserted from the insertion side 111 to be fixed inside the temperature sensor accommodation slot 120a. Specifically, the temperature sensor accommodation slot 120a has a greater radial length L3 at the insertion side 111 than a radial length L4 of the temperature sensor accommodation slot 120a at the extension side 113, such that the first hairpin conductor 140a, the second hairpin conductor 140b, and the temperature sensor 150 can be simultaneously inserted in the core 110 from the insertion side 111 of the core 110 and stably fixed in the temperature sensor accommodation slot 120a. In an application, the diameter and the radial length L4 of the temperature sensor accommodation slot 120a at the extension side 113 is smaller than the diameter and the radial length L3 at the insertion side 111. Therefore, when the extension side 113 of the core 110 faces the ground, the insertion side 111 is farther from the ground than the extension side 113, such that the gravity fixes the first hairpin conductor 140a, the second hairpin conductor 140b, and the temperature sensor 150 is stably fixed to the temperature sensor accommodation slot 120a after being assembled.

Reference is made to FIG. 3. In some embodiments of the present invention, the motor stator 100 includes a heat shrinking film F. The heat shrinking film F covers the temperature sensor 150, a part of the first axial extension portion 143a, and a part of the second hairpin conductor 140b, and thus the first hairpin conductor 140a, the second hairpin conductor 140b, and the temperature sensor 150 can be inserted in the temperature sensor accommodation slot 120a, simultaneously. In an application, the heat shrinking film F covers and fixes the first hairpin conductor 140a, the second hairpin conductor 140b, and the temperature sensor 150 via thermal shrinkage, and then the fixed first hairpin conductor 140a, the second hairpin conductor 140b, and the temperature sensor 150 are inserted in the temperature sensor accommodation slot 120a from the insertion side 111 of the core 110. Therefore, the heat shrinking film F is benefit to fix the temperature sensor 150 to the temperature sensor accommodation slot 120a efficiently and accurately. In the temperature sensor accommodation slot 120a, the temperature sensor 150 is fixed between the first hairpin conductor 140a and the second hairpin conductor 140b by the heat shrinking film F, so as to prevent the temperature sensor 150 in the core 110 from shaking and affecting the temperature detection when the motor 10 is rotating.

In other embodiments of the present invention, fixing glue P can be used to fix the temperature sensor 150, the first hairpin conductor 140a, and the second hairpin conductor 140b to the temperature sensor accommodation slot 120a. Specifically, the fixing glue P is filled in the temperature sensor accommodation slot 120a and a gap between the temperature sensor 150 and the hairpin conductors 140 inside the temperature sensor accommodation slot 120a. The fixing glue P can fix the first hairpin conductor 140a, the second hairpin conductor 140b, and the temperature sensor 150 to each other, and thus the fixing glue P can prevent the temperature detection from being affected by the shaking caused by the rotation of the motor 10.

Reference is made to FIG. 4. The temperature sensor accommodation slot 120a includes a first slot space 121a and a second slot space 123a, in which the first slot space 121a and the second slot space 123a are adjacent in the axial direction Y and communicated with each other. In addition, the first slot space 121a has a radial length L3 greater than a radial length L4 of the second slot space 123a, and the first slot space 121a has a space size greater than a space size of the second slot space 123a. The first axial extension portion 143a and the temperature sensor 150 are disposed in the first slot space 121a, and the temperature sensor 150 is farther from the outer circumferential surface 115 of the core 110 than the first axial extension portion 143a in the radial direction X. The second axial extension portion 145a is disposed in the second slot space 123a, and the temperature sensor 150 adjoins the second axial extension portion 145a along the axial direction Y. The first slot space 121a and the second slot space 123a form a step-shaped inner wall in the temperature sensor accommodation slot 120a. In some embodiments of the present invention, the first hairpin conductor 140a conformally extends along the step-shaped inner wall, so as to form the first axial extension portion 143a and the second axial extension portion 145a. The first axial extension portion 143a supports a side surface of the temperature sensor 150 in the radial direction X, and the second axial extension portion 145a supports a bottom portion of the temperature sensor 150 in the axial direction Y. When the motor 10 is operating or being transported, the temperature sensor 150 in the core 110 has outstanding stability.

Reference is made to FIGS. 3-7. The motor stator 100 further includes an insulation structure 160 which covers the first hairpin conductor 140a and the second hairpin conductor 140b to be electrically insulated from each other and from the core 110. The insulation structure 160 includes an R-shaped insulator 161 (shown in FIG. 6) and a B-shaped insulator 163 (shown in FIG. 7). The R-shaped insulator 161 and the B-shaped insulator 163 are connected along the axial direction Y, and the R-shaped insulator 161 and the B-shaped insulator 163 can be a continuous piece of material or not continuous pieces. In the first slot space 121a, the R-shaped insulator 161 simultaneously covers the first axial extension portion 143a of the first hairpin conductor 140a and the second hairpin conductor 140b, so as to separate and electrically insulate the first hairpin conductor 140a and the second hairpin conductor 140b from the other hairpin conductors 140. In the second slot space 123a, the B-shaped insulator 163 covers the second axial extension portion 145a of the first hairpin conductor 140a and the second hairpin conductor 140b, so as to separate and insulate the first hairpin conductor 140a and the second hairpin conductor 140b from the other hairpin conductors 140.

In one or more embodiments of the present invention, the motor stator 100 includes the insulation structure 160 and a U-shaped insulator 170, in which the insulation structure 160 includes the R-shaped insulator 161. The R-shaped insulator 161 includes a closing part 161a and an opening part 161b, and the closing part 161a surrounds two of the hairpin conductors 140. The opening part 161b and the U-shaped insulator 170 collectively surround the temperature sensor 150, the first axial extension portion 143a of the first hairpin conductor 140a, and a part of the second hairpin conductor 140b for accommodating the first hairpin conductor 140a, the second hairpin conductor 140b, and the temperature sensor 150, such that the R-shaped insulator 161 separates and insulates the first hairpin conductor 140a and the second hairpin conductor 140b from the other hairpin conductors 140. Compared to accommodating only two of the hairpin conductors 140, accommodating the first hairpin conductor 140a, the second hairpin conductor 140b, and the temperature sensor 150 occupies a greater space, so that a distance between the opening part 161b and the U-shaped insulator 170 is adjustable for wrapping the first hairpin conductor 140a, the second hairpin conductor 140b, and the temperature sensor 150. According to the occupied spaces of the first hairpin conductor 140a, the second hairpin conductor 140b, and the temperature sensor 150, adjusting the relative positions of the opening part 161b and the U-shaped insulator 170 can accommodate the temperature sensor 150 in different sizes and provide insulation and temperature insulation effect.

In one or more embodiments of the present invention, the temperature sensor 150 is substantially rectangular in shape, and the first hairpin conductor 140a also has a rectangular cross section. Therefore, the first hairpin conductor 140a is in direct thermal contact with the temperature sensor 150 when inserted in the temperature sensor accommodation slot 120a, and thus a contacting surface between the first hairpin conductor 140a and the temperature sensor 150 increases so as to improve the sensitivity of the temperature detection. The present invention is not limited in this respect, and the hairpin conductors 140 can have shapes or cross sections corresponding to a shape and a cross section of the temperature sensor 150, respectively.

In summary, the temperature sensor of the motor in the present invention is accommodated in the temperature sensor accommodation slot, and the motor has a temperature sensor accommodation slot in a different size than other wire slots to accommodate the temperature sensor and the hairpin conductors. Therefore, when the motor is operating, the temperature sensor can accurately detect the actual temperature of hot spots, so as to control the temperature of the motor and positively influence the operational performance of the motor.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A motor stator comprising:
a ring-shaped core defining a rotor accommodation space at a center of the core, wherein the core comprises an insertion side and an extension side;
a plurality of slots disposed in the core and arranged to surround the rotor accommodation space circumferentially, and wherein each slot extends radially away from the rotor accommodation space, such that hairpin conductors are inserted in the slots from the insertion side and to protrude from the extension side,
wherein at least one of the slots is a temperature sensor accommodation slot which has a radial length at the insertion side greater than a radial length of any other one of the slots at the insertion side except for the temperature sensor accommodation slot;
a first hairpin conductor disposed at an end of the temperature sensor accommodation slot distal to the rotor accommodation space;
a second hairpin conductor disposed in the temperature sensor accommodation slot and adjacent to the first hairpin conductor; and
a temperature sensor disposed in the temperature sensor accommodation slot and between the first and second hairpin conductors.

2. The motor stator of claim 1, wherein the first hairpin conductor comprises a bent portion, such that a temperature sensor accommodating space is formed between the first hairpin conductor and the second hairpin conductor.

3. The motor stator of claim 1, wherein the first hairpin conductor comprises a bent portion, a first axial extension portion, and a second axial extension portion, and the bent portion is disposed between the first and second axial extension portions, such that the first axial extension portion is radially away from the second axial extension portion to form a temperature sensor accommodating space.

4. The motor stator of claim 3, wherein the temperature sensor is thermally in contact with the bent portion or the first axial extension portion.

5. The motor stator of claim 3 further comprising a heat shrinking film surrounding the temperature sensor and a part of the first axial extension portion, or a fixing glue filled in a part of the temperature sensor accommodation slot surrounding the temperature sensor and a part of the first axial extension portion.

6. The motor stator of claim 3 further comprising an R-shaped insulator, wherein the R-shaped insulator adjoins the first axial extension portion of the first hairpin conductor and the second hairpin conductor.

7. The motor stator of claim 1 further comprising an R-shaped insulator and a U-shaped insulator, wherein the R-shaped insulator has a closing part and an opening part, and wherein the opening part of the R-shaped insulator and the U-shaped insulator collectively surround the temperature sensor, the first axial extension portion of the first hairpin conductor, and the second hairpin conductor.

8. The motor stator of claim 1, wherein the temperature sensor accommodation slot has a radial length at the insertion side greater than a radial length at the extension side.

9. The motor stator of claim 1, wherein the first hairpin conductor is a neutral wire.

10. A motor comprising:
a rotor;
a core defining a rotor accommodation space for accommodating the rotor;
a plurality of slots being disposed in the core and arranged to surround the rotor accommodation space circumferentially, wherein each slot axially extends and accommodates hairpin conductors, and wherein at least one of the slots is a temperature sensor accommodation slot;

a first hairpin conductor disposed in the temperature sensor accommodation slot, wherein the first hairpin conductor comprises a bent portion, a first axial extension portion, and a second axial extension portion, and wherein the bent portion is connected between the first axial extension portion and the second axial extension portion; and a temperature sensor adjoining the first axial extension portion of the first hairpin conductor, wherein the first axial extension portion is radially farther from the rotor accommodation space than the second axial extension portion.

11. The motor of claim 10 further comprising a second hairpin conductor disposed in the temperature sensor accommodation slot, and wherein the second hairpin conductor axially extends and adjoins the second axial extension portion of the first hairpin conductor, wherein the motor further includes a temperature sensor accommodating space between the first axial extension portion of the first hairpin conductor and the second hairpin conductor.

12. The motor of claim 11, wherein an area of the temperature sensor accommodating space adjoins the bent portion.

13. The motor of claim 10 further comprising a heat shrinking film surrounding the temperature sensor and a part of the first axial extension portion, or a fixing glue filled in a part of the temperature sensor accommodation slot surrounding the temperature sensor and a part of the first axial extension portion.

14. The motor of claim 10, wherein the core comprises a first side and a second side, the first axial extension portion protrudes from the first side, and the second axial extension portion protrudes from the second side, and wherein the temperature sensor accommodation slot has a diameter at the first side greater than a diameter at the second side.

15. The motor of claim 11 further comprising an R-shaped insulator adjoining the first axial extension portion of the first hairpin conductor and the second hairpin conductor.

16. The motor of claim 11 further comprising an R-shaped insulator and a U-shaped insulator, wherein the R-shaped insulator has a closing part and an opening part, and wherein the opening part of the R-shaped insulator and the U-shaped insulator collectively surround the temperature sensor, the first axial extension portion of the first hairpin conductor, and the second hairpin conductor.

17. The motor of claim 10, wherein the temperature sensor is rectangular in shape, and wherein the first hairpin conductor has a rectangular cross-section for immediately contacting the temperature sensor.

18. A motor stator comprising:

a ring-shaped core;

a plurality of slots being disposed in the core and extending radially to an outer circumferential surface of the core, wherein at least one of the slots is a temperature accommodation slot including a first slot space and a second slot space axially adjacent to the first slot space, and wherein the first slot space has a radial length greater than a radial length of the second slot space;

a first hairpin conductor comprising a first axial extension portion disposed in the first slot space and a second axial extension portion disposed in the second slot space, wherein the first axial extension portion is connected to the second axial extension portion; and a temperature sensor disposed in the first slot space, wherein the temperature sensor is farther away from the outer circumferential surface of the core than the first axial extension portion.

19. The motor stator of claim 18 further comprising a plurality of second hairpin conductors, wherein the first axial extension portion of the first hairpin conductor is closer to the outer circumferential surface of the core than the second hairpin conductors.

20. The motor stator of claim 19, wherein the temperature sensor axially adjoins the second axial extension portion of the first hairpin conductor.

* * * * *